(12) United States Patent
Noonan

(10) Patent No.: US 9,598,021 B2
(45) Date of Patent: Mar. 21, 2017

(54) VEHICLE SEAT HOLSTER MOUNT

(71) Applicant: John Scott Noonan, Merritt Island, FL (US)

(72) Inventor: John Scott Noonan, Merritt Island, FL (US)

(73) Assignee: John S. Noonan, Merritt Island, FL (US)

( * ) Notice: Subject to any disclaimer, the term of this patent is extended or adjusted under 35 U.S.C. 154(b) by 114 days.

(21) Appl. No.: 14/733,817

(22) Filed: Jun. 8, 2015

(65) Prior Publication Data
US 2016/0355139 A1    Dec. 8, 2016

(51) Int. Cl.
| | |
|---|---|
| *B60R 7/14* | (2006.01) |
| *B60R 7/04* | (2006.01) |
| *F41A 23/00* | (2006.01) |
| *F41C 33/04* | (2006.01) |
| *B60R 11/00* | (2006.01) |
| *F41A 23/26* | (2006.01) |

(52) U.S. Cl.
CPC .............. *B60R 7/04* (2013.01); *F41C 33/041* (2013.01); *B60R 7/043* (2013.01); *B60R 7/14* (2013.01); *B60R 2011/0012* (2013.01); *B60R 2011/0031* (2013.01); *F41A 23/26* (2013.01); *Y10S 224/912* (2013.01)

(58) Field of Classification Search
CPC ... B60R 7/043; B60R 7/14; B60R 2011/0012; Y10S 224/912; Y10S 224/913; F41A 23/26
USPC ............................................ 224/275; 211/64
See application file for complete search history.

(56) References Cited

U.S. PATENT DOCUMENTS

| | | | | |
|---|---|---|---|---|
| 3,497,077 A | * | 2/1970 | Sjostrand | B60R 7/14 211/64 |
| 3,802,612 A | * | 4/1974 | Smith | B60R 7/14 211/64 |
| 3,942,691 A | * | 3/1976 | Sisak | B60R 7/14 224/275 |
| 4,364,499 A | * | 12/1982 | McCue | B60R 7/14 211/64 |
| 4,579,263 A | * | 4/1986 | Ehmke | B60R 7/14 224/275 |
| 5,129,563 A | * | 7/1992 | Dillon | B60R 7/14 224/275 |
| 5,511,711 A | * | 4/1996 | Kunz | B60R 7/14 224/539 |
| 5,791,499 A | * | 8/1998 | Zebbedies | B60R 7/14 211/64 |
| 5,799,850 A | * | 9/1998 | Ryder | B60R 7/14 224/42.11 |
| 6,279,799 B1 | * | 8/2001 | Horton | B60R 7/14 211/64 |
| 6,293,447 B1 | * | 9/2001 | Jorgensen | B60R 7/14 211/64 |
| 6,766,927 B1 | * | 7/2004 | Cart | B60R 7/14 206/317 |

(Continued)

Primary Examiner — Justin Larson
(74) Attorney, Agent, or Firm — John S. Noonan

(57) ABSTRACT

A Vehicle Seat Holster Mount is presented that includes a strap mount which is the main mounting component. The upper cinch strap wraps around the seat belt receptacle. The clamp head is connected to the holster rail that is encompassed by a grip sleeve that is compressed into the space between the seats and consoles to hold the holster and/or items in place.

8 Claims, 6 Drawing Sheets

(56) References Cited

U.S. PATENT DOCUMENTS

| | | | | |
|---|---|---|---|---|
| 7,527,314 B2 * | 5/2009 | Dohan | ............... | B60R 11/00 296/37.8 |
| 8,056,970 B1 * | 11/2011 | Phillips | ............... | B60N 2/6009 296/1.07 |
| 8,162,189 B2 * | 4/2012 | Robins | ............... | B60R 7/08 224/275 |
| 8,672,401 B2 * | 3/2014 | Schreiber | ............... | B60N 2/7005 297/182 |
| 8,950,596 B2 * | 2/2015 | Arabian | ............... | B60R 7/14 211/64 |
| 9,284,053 B2 * | 3/2016 | Cook | ............... | B60R 7/14 |
| 9,428,114 B2 * | 8/2016 | Mothersele | ............... | B60R 7/00 |
| 2007/0235483 A1 * | 10/2007 | Konet | ............... | B60R 7/043 224/275 |
| 2012/0305613 A1 * | 12/2012 | Allen | ............... | A47B 81/005 224/545 |
| 2015/0069103 A1 * | 3/2015 | Fife | ............... | B60R 7/14 224/555 |

* cited by examiner

VEHICLE SEAT HOLSTER MOUNT

CROSS-REFERENCE TO RELATED APPLICATIONS

This Application Claims Priority to Provisional Patent Application filed on 8 Jun. 2014 with application No. 62/009,320 titled Vehicle Seat Holster Mount.

FEDERALLY SPONSORED RESEARCH

Not Applicable

SEQUENCE LISTING OR PROGRAM

Not Applicable

FIELD OF THE INVENTION

This invention relates in general to accessories for vehicles; more particularly, a mount for a handgun holster or some other similar type of holster to attach to an adjustable rail with a clamping attachment that mounts directly to the seat belt receptacle. The design is intended for the use of minimum supporting straps and fasteners to secure the holster or pouches in a safe and secure place between the seats or consoles of vehicles for accessibility of desired items when it requires immediate usage.

BACKGROUND OF THE INVENTION

In recent years more people have been traveling in vehicles with their firearms as well as other personal items such as cell phones, GPS, and other electronic items. It is often necessary to take along such items during trips. Firearms have become more common in vehicles because of the increasing desire of personnel to conceal and carry for protection, however storage space inside vehicles (i.e. glove boxes, seat consoles, etc.) are getting smaller due to the overall size of a vehicle becoming more compact. This being true, there are limited places to store a firearm inside the vehicle, especially for the operator that may need to protect against any hostile situations. The current invention also benefits the driver of a vehicle to secure any other item, most common cases a cell phone. The phone, as an example, can be easily reached without the operator of a vehicle being distracted.

There are assortments of holsters for firearms that most people can choose from to purchase. Primarily the styles that are most suitable are compact and easily concealable under or inside an individual's garments. Most holsters, if not all, have a belt loop and metal or polymer clip to attach to a belt. Professionals, such as law enforcement and military personnel, are subjected to sitting long hours with having to wear the holster and the restriction of the seatbelt which becomes uncomfortable. This also makes it difficult when reaching for a weapon in time of need. A competent person may find this inaccessible with being in a seat belt restraint. Most vehicles have area or space between seats and/or consoles which allows for a suitable place to mount a firearm holster.

There is no prior art that suggests ways to remedy the problems of securing a firearm holster, or any other type, to a vehicle seat. Especially for easy access when inside the interior of a vehicle to be used when needed. Most vehicles of recent times have spaces between the adjacent seats or a seat with a console. This space or gap exists to allow a driver to move or adjust the seat to reach the pedals and steering column. This space also allows room for the seat belt receptacle to protrude upward from the seat base to give the operator of the vehicle the option of seat belt restraints.

BRIEF SUMMARY OF THE INVENTION

The vehicle seat holster mount can be used on most vehicles that have a seat belt receptacle that is fastened to the floor and protrudes upward to the side of the vehicle seat. The mount is attached by strapping around the seat belt receptacle cover and the steel bar connected to plastic or metal steel to support to the vehicles' floorboard. A strap mount is attached to a flexible rail that contours the side of the seat. The embodiment extends out becoming adjustable, away from the clamp head and seatbelt receptacle, towards the edge of the seat. The rail is encompassed by dense foam material that allows for a pressed fit to keep holster in a static position.

BRIEF DESCRIPTION OF THE SEVERAL VIEWS OF THE DRAWING

For a more complete understanding of the present invention and the advantages thereof, reference is now made to the following descriptions taken in conjunction with the accompanying drawings, in which.

DETAILED DESCRIPTION OF THE INVENTION

Figure 1:
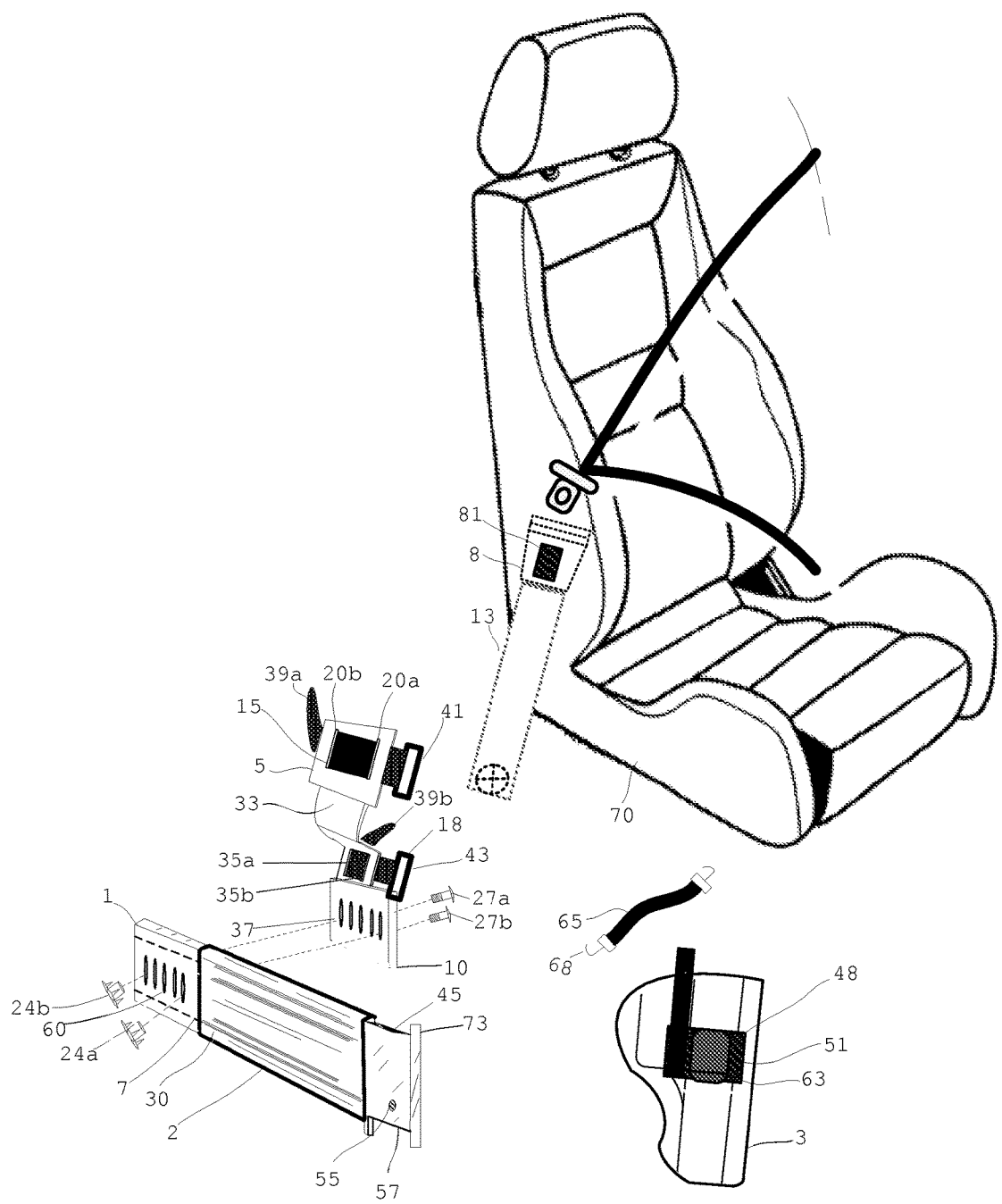
FIG. 1—Illustrates the complete system with the clamp strap that is attached to the seat with a holster.

FIG. 1 illustrates a perspective of the present invention with the main section or strap mount 10 being the hub of the invention attached to seat belt receptacle 8. The clamp head 5 is the upper embodiment of strap mount 10 and provides a securing means to the seat belt receptacle 8. It can be made of molded materials, plastics or any other material that can be used to fit around the seat belt receptacle 8. The middle portion of strap mount 10 is the strap mount neck 33 which is positioned below the seat belt receptacle 8 and is wrapped securely around the receptacle strap 13.

An upper cinch strap 15 made of Velcro® or having a loop and hook portion is placed through a pair of upper strap slots 20a/b. The straps are then securely wrapped around seat belt receptacle 8. A lower cinch strap 18 is positioned through another set of slots 35a/b. The straps are then securely wrapped around receptacle strap 13.

The rail slot 7 is fabricated into holster rail 2 and the slot is attached to the base of strap mount 10 fastened by screws 27a/b and a pair of T-nuts 24a/b. Rail slot 7 is encased by a foam grip sleeve 30 extending along the width of holster rail 2 and is compressed between the spaces of a vehicle seat 70 or console area. The combination of the upper cinch straps 15, lower cinch straps 18, and foam grip sleeve 30 provides a secure position for the holster 3 or any other item attached to the end of the mount. The top clip slot 45 and lock slot 57 provides a locking system for the holster clip 51 which is secured by the holster belt loop 63.

Figure 2:
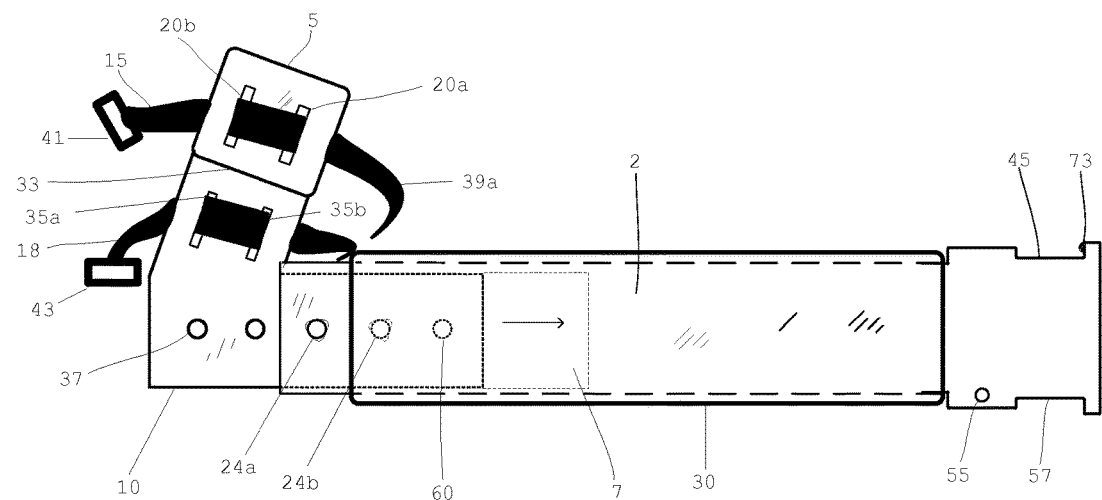
FIG. 2—Illustrates a side view.

FIG. 2 illustrates an embodiment of a holster rail 2 with a slidable strap mount 10 connected to the holster rail 2. The dimensions of the holster rail 2 attachment can be elongated towards the front end of the seat and beyond, if necessary. To increase the distance to extend the holster rail 2 outward, it can be incremented by the alignment of mount hole 37 and rail hole 60. FIG. 2 also illustrates T-nuts 24a/b which are pressed into the outer surface and aligned with rail hole 60 of holster rail 2.

Figure 3:
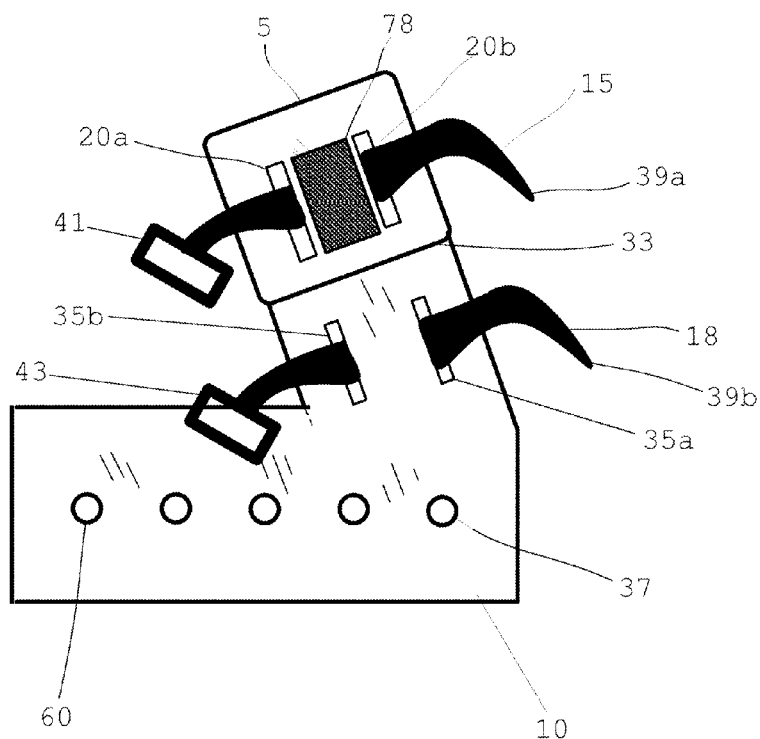
FIG. 3—Illustrates a side view.

FIG. 3 illustrates an embodiment of a strap mount 10 having a rail hole 60 for attaching to the holster rail 2. A clamp head 5 extends upwardly from one end of the strap mount 10 to accommodate most seat belts commonly angled. The clamp head 5 has a lower strap slot 35a and a second lower strap slot 35b to receive a lower cinch strap 18. The upper cinch strap 15 and lower cinch strap 18 are cinched down by sliding the strap tab end 39a/b through upper strap loop 41 and lower strap loop 43 to prevent the attachment from moving upward or downward. A Velcro® loop pad 78 is adhered to the inside surface of the clamp head 5 and mated with the Velcro® hook pad 81 on the outer surface of seat belt receptacle 8 cover.

Figure 4:
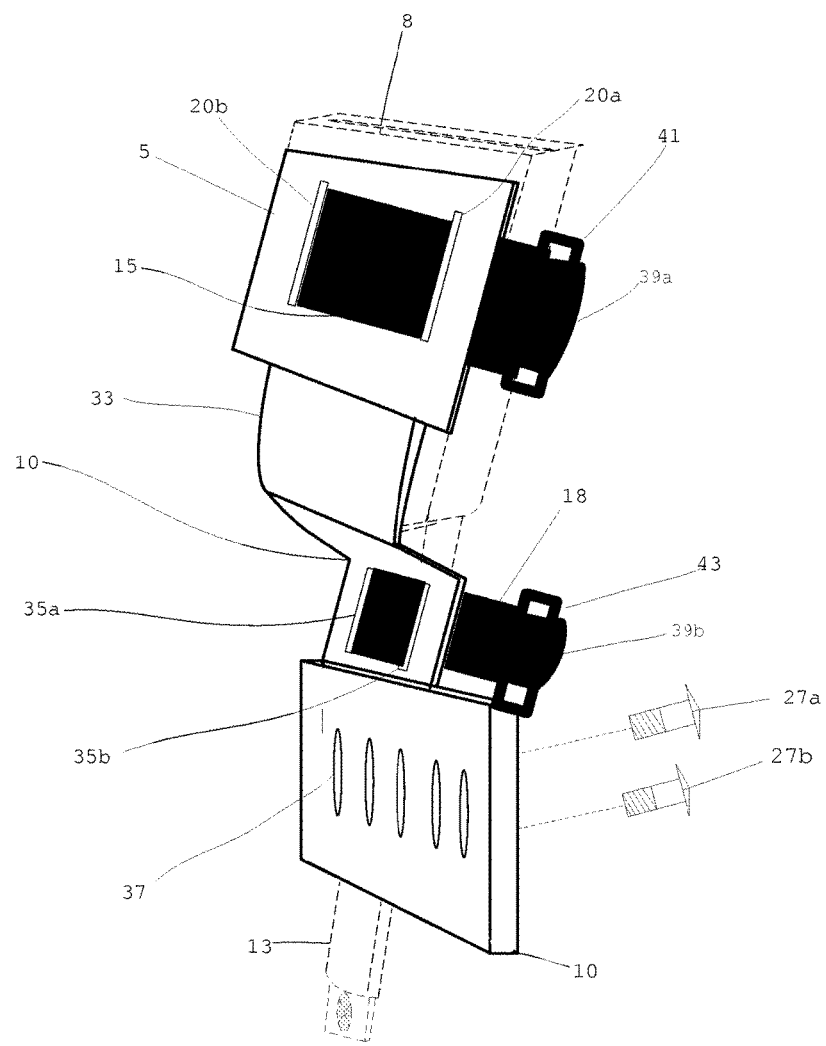
FIG. 4—Illustrates a front view.

FIG. 4 illustrates an embodiment of a strap mount 10 having a mount hole 37 for attaching to the holster rail 2. The fastener screws 27a/b are aligned with mount holes 37 and fastened to T-nuts 24a/b that are pressed into holster rail 2 in order to have a secure bond between rail slot 7 and strap mount 10. When attaching strap mount 10 to the seat belt receptacle 8, it is further enhanced by the offset inherently built into the strap mount neck 33. This offset aids in the contouring of the varieties of seat belt equipment.

Figure 5:
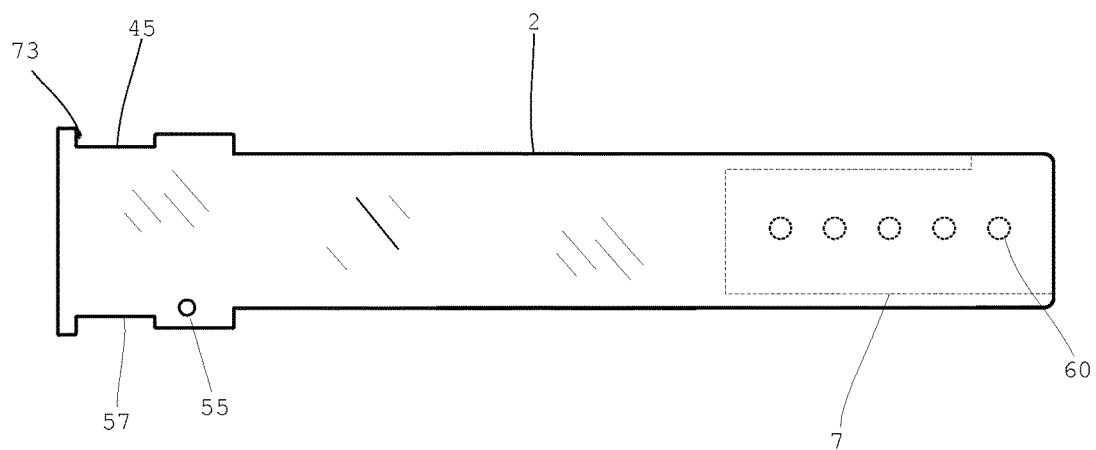
FIG. 5—Illustrates a side view.

FIG. 5 illustrates an embodiment of a holster rail 2 which is constructed of a durable, polymer, flexible material that contours to the spaces or gaps between seats and/or console. The material is rigid and dense enough to withstand the friction of items being clipped or attached to the surface without causing damage. On one end, rail slot 7 has an internal planar surface which supports the base of the strap mount 10 to slide to be adjusted to the desired position. On the opposing end, clip slot 45 and lock slot 57 are the receiving portion of the holster clip 51 which is attached to the holster by belt loop 48. Lock tab 73 prevents the metal clip, or any other items attached to the vehicle seat holster mount 1, from inadvertent detachment. For additional security, draw strap 65 can be used for attaching the draw strap hook 68 to the draw strap hole 55 and the opposite end of the draw strap 65 can be attached to the seat frame.

Figure 5A:
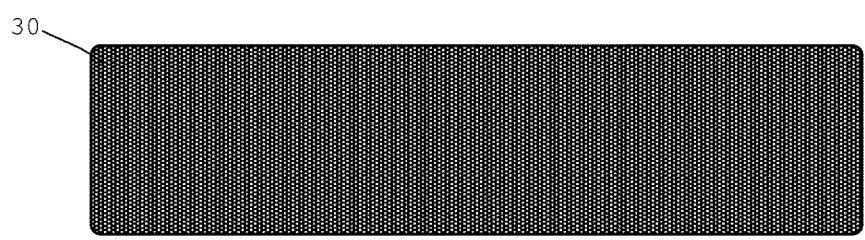
FIG. 5A—Illustrates a side view.

FIG. 5A illustrates the holster rail 2 encased by the neoprene grip sleeve 30 and by the nature of this material, it adheres to the adjacent surfaces. In addition, due to the density of the neoprene material, it fills in the gaps therefore allowing nothing to fall in between the gaps.

Figure 6:
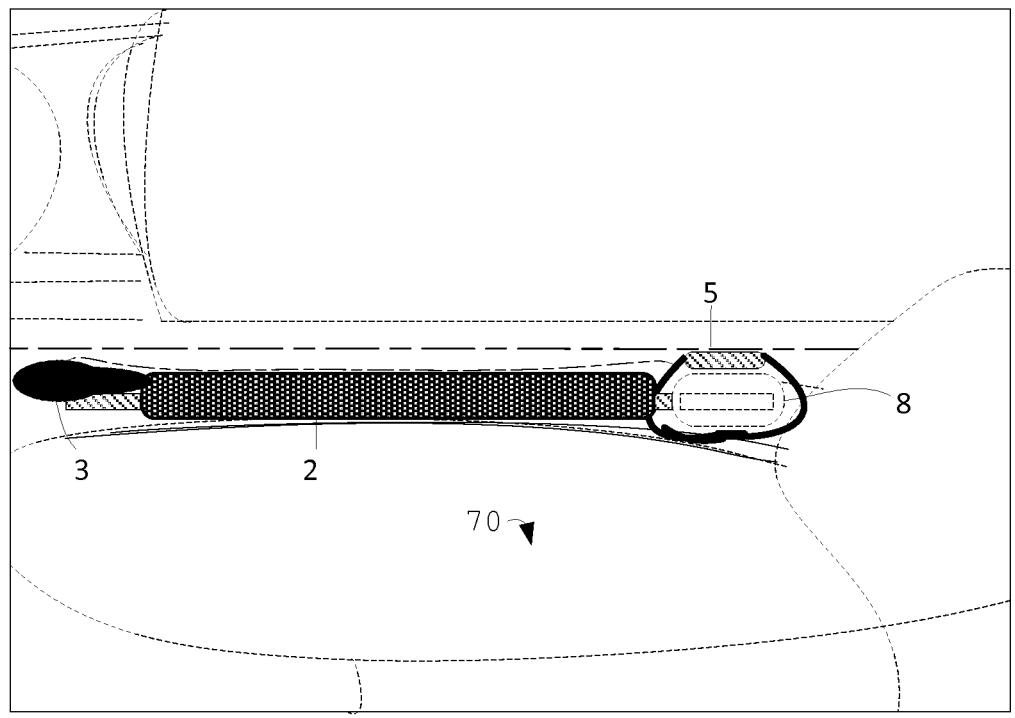
FIG. 6—Illustrates a planar view of the attachment installed in a vehicle.

FIG. 6 illustrates an embodiment of a vehicle seat holster mount 1 installed in the open space between the seats and/or console. This illustration shows a holster attached to the end of the mount.

REFERENCE NUMERALS IN DRAWINGS

1—vehicle seat holster mount
2—holster rail
3—holster (optional)
5—clamp head
7—rail slot
8—seat belt receptacle
10—strap mount
13—receptacle strap
15—upper cinch strap
18—lower cinch strap
20a/b—upper strap slot(s)
24a/b—T—nut(s)
27a/b—fasteners screw(s)
30—grip sleeve
33—strap mount neck
35a/b—lower strap slot(s)
37—mount hole(s)
39a/b—strap tab end
41—upper strap loop
43—lower strap loop
45—clip slot
48—belt loop
51—holster clip
55—draw strap hole
57—lock slot
60—rail hole
63—holster belt loop
65—draw strap
68—draw strap hook
70—vehicle seat
73—lock tab
78—Velcro® loop pad
81—Velcro® hook pad

What is claimed:

1. A vehicle seat holster mount for positioning in a gap between a vehicle seat and a vehicle console, said holster mount comprising: a holster rail including a rail slot and at least one rail hole formed therein; a strap mount including at least one mount hole, wherein said strap mount is configured to be slid into said rail slot such that a mount hole is aligned with a rail hole; a strap mount neck connected to and extending upwardly from said strap mount; a clamp head connected to an upper end of said strap mount neck, said clamp head having a pair of upper strap slots and a pair of lower strap slots, wherein each pair of said upper and lower strap slots is configured to receive a separate strap for securing said holster mount to a vehicle seat belt receptacle.

2. The vehicle seat holster mount of claim 1, further comprising a first strap disposed through said pair of upper strap slots.

3. The vehicle seat holster mount of claim 1, further comprising a second strap disposed through said pair of lower strap slots.

4. The vehicle seat holster mount of claim 2, wherein said first strap includes hook and loop fasteners.

5. The vehicle seat holster mount of claim 3, wherein said second strap includes hook and loop fasteners.

6. The vehicle seat holster mount of claim 1, wherein the length of said holster mount can be adjusted by sliding said strap mount within said rail slot in order to align a rail hole with a mount hole such that a fastener can be inserted through said aligned holes.

7. The vehicle seat holster mount of claim 1, where said holster rail is flexible such that it can contour to the spaces or gaps between different vehicle seats and consoles.

8. The vehicle seat holster mount of claim 1, further comprising a grip sleeve encasing said holster rail, wherein said grip sleeve is configured to fill any remainder of said gap between said vehicle seat and said vehicle console.

* * * * *